United States Patent [19]

Svoma

[11] 4,361,976
[45] Dec. 7, 1982

[54] FISHING LINE SINKER AND MOLD FOR MAKING SAME

[76] Inventor: Joseph H. Svoma, 175 Kinman Ave., Apt. 7, Goleta, Calif. 93010

[21] Appl. No.: 158,371

[22] Filed: Jun. 11, 1980

[51] Int. Cl.³ ............................................. A01K 95/00
[52] U.S. Cl. ..................................... 43/43.1; 43/43.14
[58] Field of Search ................... 43/42.22, 43.1, 43.14, 43/44.89, 44.9, 44.91, 44.92, 44.95; 46/26; 220/23.2, 23.4; 403/206, 215, 274; 229/47

[56] References Cited

U.S. PATENT DOCUMENTS

| | | | |
|---|---|---|---|
| 165,256 | 7/1875 | Roberts et al. | 229/47 |
| 2,028,661 | 1/1936 | Gustafson et al. | 229/47 |
| 2,863,253 | 12/1958 | Hettinger | 43/43.14 |

FOREIGN PATENT DOCUMENTS

| | | | |
|---|---|---|---|
| 15297 | of 1890 | United Kingdom | 43/43.14 |
| 690469 | 4/1953 | United Kingdom | 43/43.1 |

Primary Examiner—Stephen G. Kunin
Assistant Examiner—K. Bradford Adolphson
Attorney, Agent, or Firm—Jack C. Munro

[57] ABSTRACT

A fishing line sinker which is composed of a block of metal one end of which includes an opening and the opposite end of which includes a protruding wire member. The wire member of one block of metal is to be inserted through an opening of a second block of metal to thereby connect together blocks of metal for increasing the weight of the fishing line sinker. Additionally, a mold is provided for making the sinker which takes the form of a pair of pivotally interconnected members each of which has a mold cavity. The mold cavities can be used in a connected arrangement or in an individual arrangement.

2 Claims, 6 Drawing Figures

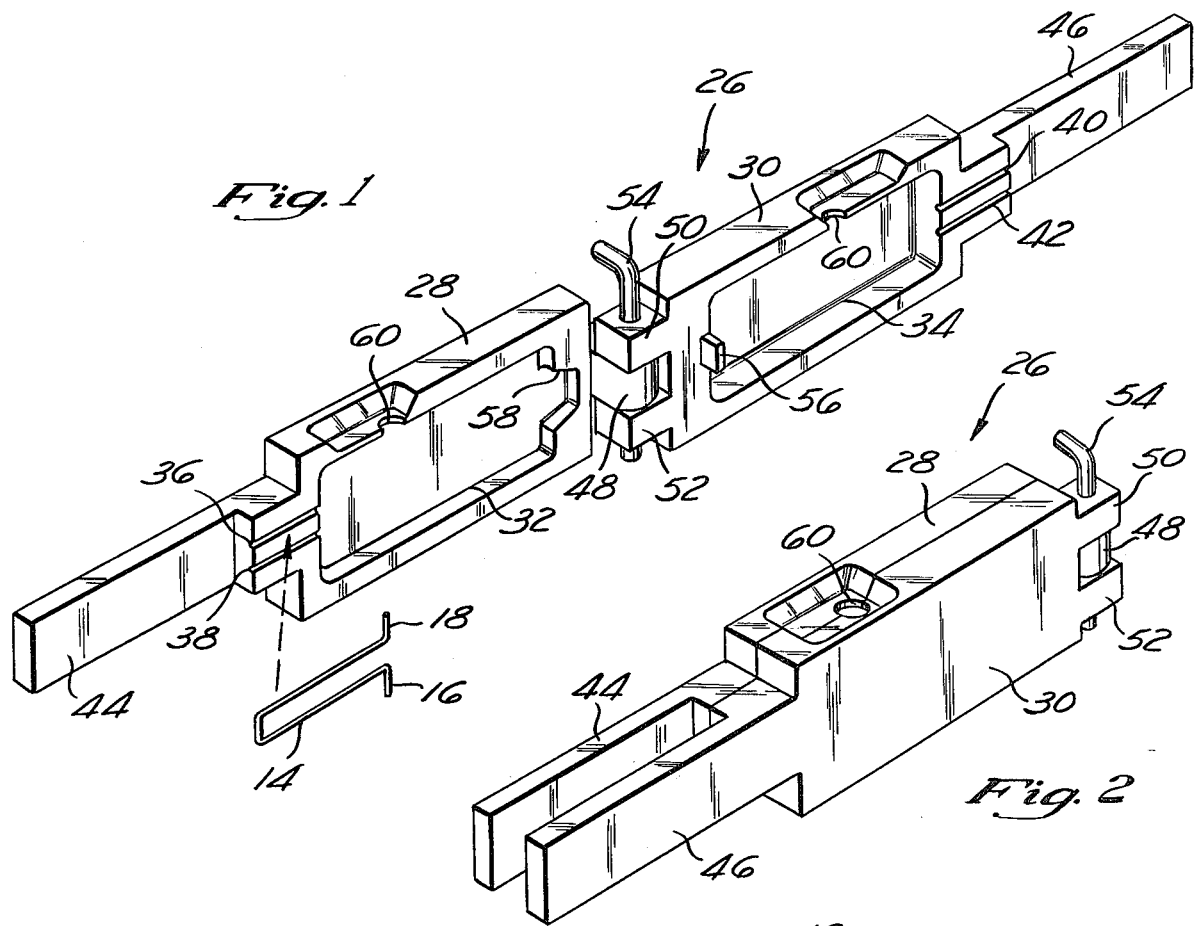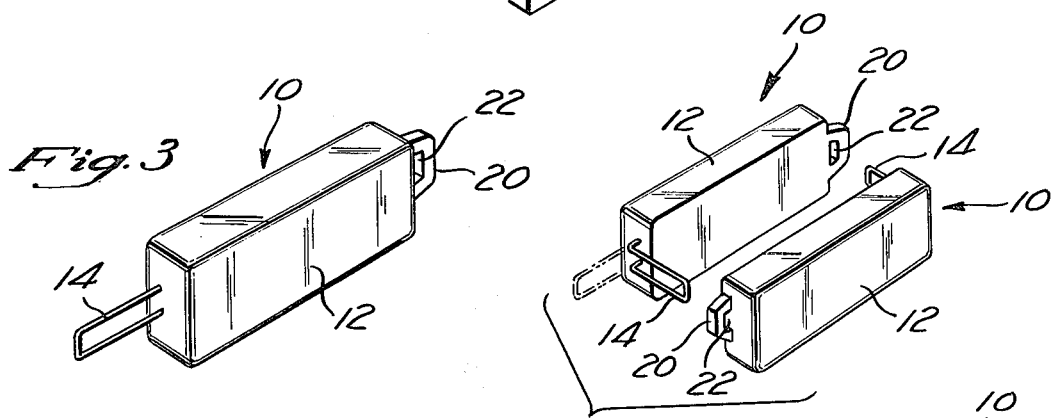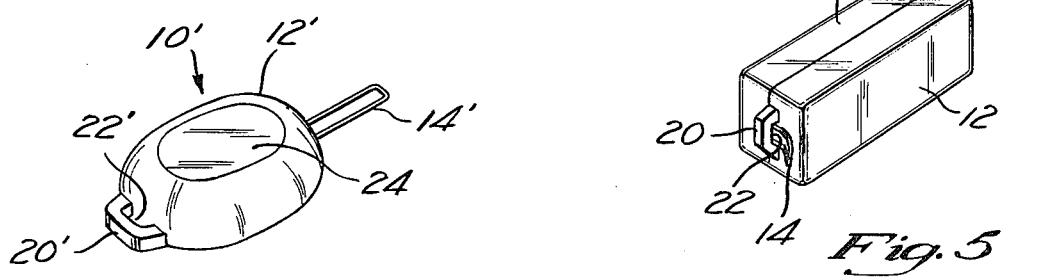

FISHING LINE SINKER AND MOLD FOR MAKING SAME

BACKGROUND OF THE INVENTION

Fishermen are known to carry a substantial amount of equipment. Included within this equipment are sinkers. In fresh water fishing, the weight of the sinkers is not substantial. In salt water fishing weights of one, two and three pounds are very common. Also, there is a possibility that a weight may be lost. Therefore, it is quite normal for a salt water fisherman to carry three one pound sinkers, two two pound sinkers and two three pound sinkers. This amounts in weight to thirteen pounds. Not only is this amount of weight undesirable to be carried around on a fishing trip, but also, such weights in and of themselves are expensive. At the present time, sinkers are costing approximately one dollar per pound. This means that a total sinker cost in the above example would be thirteen dollars.

Also, a good many sinkers are designed of a rounded configuration. Rounded configurations of sinkers have a tendency to roll around on the deck of a boat. This very often results in the sinkers rolling off the deck of a boat into the water and thereby being lost. It would be desirable for a sinker to be constructed of some form of a polygonal shape, so to thereby avoid undesirable movement of the sinker.

SUMMARY OF THE INVENTION

The structure of this invention relates to the design of a particular type of sinker which is formed of lead in a polygonal shape. The fore end of the sinker has extending therefrom a bendable wire member. The aft end of the sinker includes an opening. A wire member of a second sinker is to extend through an opening of the first sinker and the wire member bent so as to prevent detachment therebetween. A pair of sinker members can be placed in a facing up-side-down position and connect together to form a single unit. Also, sinkers can be connected together in an in-line manner. Therefore, fewer in numbers of sinkers are carried due to multiple weight available by assembly. A mold is to be used which is constructed of a pair of members each of which includes a separate cavity. The pair of members are pivotally connected together by a pivot pin which is to be removable so that the members can be located in a facing relationship to thereby form a single enlarged mold cavity, or the pivot pin removed and the backside of one of the mold members located adjacent the front side of the other mold member thereby forming a smaller sized mold cavity resulting in the producing of a smaller sized sinker.

BRIEF DESCRIPTION OF THE DRAWING

FIG. 1 is an isometric view of the mold employed within this invention showing the mold in the open position;

FIG. 2 is an isometric view of the mold in a closed position;

FIG. 3 is an isometric view of the sinker constructed by the mold of FIG. 1;

FIG. 4 is an isometric view depicting the procedure for connecting together a pair of the sinkers of FIG. 3 in a facing up-side-down position;

FIG. 5 is a view of the sinker arrangement of FIG. 4 which has been connected together; and FIG. 6 is an isometric view of a modified shape of sinker of this invention.

DETAILED DESCRIPTION OF THE SHOWN EMBODIMENT

Referring particularly to the drawing, there is shown within FIGS. 3, 4, and 5 the fishing line sinker 10 of this invention which takes the form of a rectangularly shaped block 12 formed of metal, such as lead. The block 12 has an outer side and an inner side, as well as a fore end and an aft end.

The fore end has attached thereto a wire member 14. Wire member 14 is basically U-shaped, with the outer end of each of the legs of the member being formed into outwardly flared sections 16 and 18. Sections 16 and 18, when embedded in the block 12, prevent dislodgement of the wire member 14 from the block 12.

The aft end of the block 12 is formed into an extension 20. The extension 20 includes an opening 22. The purpose of the opening 22 is so that a wire member 14 from another block 12 is to be inserted through the opening 22 and bent so as to connect together blocks 12. This connecting together can be in an in-line manner. However, another desirable way of connection would be as shown in FIGS. 4 and 5 in which a pair of blocks 12 have their inner sides facing each other in an abutting manner, with a wire member 14 of one block extending through an opening 22 of the other block. Each of the wire members 14 will then be bent so as to securely connect together the blocks 12. In this manner, if each block 12 weighed one pound, there would be a two pound sinker formed.

For purpose of description in the accompanying claims, when referring to one of the facing blocks 12, each referred to portion will be preceeded by the word "first". For the other block 12, each referred to section will be preceeded by the word "second". For example, first block versus second block, a first aft end verses second aft end, and so forth. It is to be understood that each of the blocks 12 will be identical in construction but are merely orientated in a reversed, side-by-side, facing relationship.

Referring particularly to FIG. 6 of the drawing, there is shown a modified form of shape of sinker 10', which is basically similar to sinker 10 and like numerals have been employed to refer to like parts. The basic shape within the sinker 10' is rounded, except that the outer side of the sinker 10' includes a flattened area 24. The purpose of the flattened area 24 is to prevent the sinker 10' from accidentally rolling off the deck of a boat, or from moving when located at rest at any other location.

One advantage of the present invention is that either sinker 10 and/or sinker 10' can be made by the fisherman or user himself through the use of a mold. Referring particularly to FIGS. 1 and 2, there is shown the molding device 26 which is to be used to mold the sinker 10.

The mold 26 is constructed of a first member 28 and a second member 30. The first member 28 has an interior surface which is formed into a first cavity 32. The second member 30 also has an interior surface, which is formed into a second cavity 34. It is to be noted that the depth of the cavity 34 is slightly greater than the depth of the cavity 32. The reason for this will be explained further on in the specification.

Formed within the interior surface of the member 28 and connecting with the cavity 32 are a pair of grooves 36 and 38. Similarly, there are formed within the interior surface of the member 30 a pair of grooves 40 and 42. The grooves 36 and 38 and 40 and 42 are so as to accommodate a wire member 14, such as depicted generally within FIG. 1.

One end of the member 28 includes a graspable handle section 44. Similarily, an end of the member 30 also includes a graspable handle section 46.

The end of the member 28 opposite the handle section 44 includes a boss 48 which has an opening (not shown) extending therethrough. The end of the member 30 opposite the handle 46 also includes a pair of spaced apart bosses 50 and 52. The bosses 50 and 52 also include openings (not shown). The boss 48 is to be located between the bosses 50 and 52 and a pivot pin 54 is to extend through the aligned openings of the bosses 48, 50 and 52. Thereby, the member 28 is pivotally attached to the member 30.

This pivotal attachment will normally be in the manner as shown within FIGS. 1 and 2 so that the cavities 34 and 32 connect together in a facing relationship. Formed within the inner surface of the member 30 is a protrusion 56. This protrusion 56 is to be located within small cavity 58, which is an extension of the cavity 32. When the members 28 and 30 are in the closed position as shown within FIG. 2, and heated liquid lead is poured through the inlet port 60 into the cavity formed by cavities 32 and 34, the sinker 10 will be formed. The opening 22 will be formed due to the location of the protrusion 56 within the smaller cavity 58. Once the lead has cooled sufficiently, the mold 26 is to be opened, as shown within FIG. 1 and the resultingly formed sinker 10 is to be removed from the mold 26.

Using the mold 26 in the position shown within FIG. 2, there is constructed a sinker 10 of a particularly given weight. In some instances, it would be desirable to construct a sinker of a lesser weight. The mold 26 can be utilized to accomplish this. To achieve this result, the pivot pin 54 is removed and the members 28 and 30 separated. The member 28 is reversed and the boss 48 again located between the bosses 50 and 52. The pivot pin 54 is then replaced. The member 28 can then be moved relative to the member 30 until the cavity 32 abutts the backside of the member 30. Liquid metal can then be poured through the portion of the port 60, which is located within the member 28, resulting in the filling of the cavity 32. In this manner, a lesser weight sinker will result, and actually, since the cavity 32 is about one third as deep as the total depth of cavities 32 and 34, the resulting weight will be approximately one third the weight of sinker 10. It is to be noted that the opening comparable to opening 22 is not formed within this smaller construction of sinker. However, such an opening can be easily formed by merely manually forming tool.

What is claimed is:

1. A fishing line sinker comprising:

a first block of metal having a first fore end and a first aft end and a first inner side and a first outer side, a first wire member attached to and extending from said first fore end, a first opening formed within said first aft end, a first extension integrally attached to said first block, said first extension having a first inner sidewall and a first outer sidewall, said first inner sidewall of said first extension being flush with said first inner side, said first outer sidewall being spaced from said first outer side;

a second block of metal having a second fore end and a second aft end and a second inner side and a second outer side, a second wire member attached to and extending from said second fore end, a second opening formed within said second aft end, a second extension integrally attached to said second block, said second extension having a second inner sidewall and a second outer sidewall, said second inner sidewall of said second extension being flush with said second inner side, said second outer side wall being spaced from said second outer side; and with said first block in a reversed side-by-side relationship with said second block with said first inner side abutting said second inner side, the said first wire member is located within said second opening and said second wire member is located within said first opening, both said first and said second wire members are then bent securing together said first block and said second block forming a single unit.

2. The fishing line sinker as defined in claim 1 wherein:

both said first outer side and said second outer side including a planar section to prevent undesired movement due to the action of gravity when said planar section is in contact with the supportive surface.

* * * * *